Jan. 27, 1953

F. A. DUTRA 2,626,973

GROUNDING TERMINAL

Filed June 28, 1949

INVENTOR
F. A. DUTRA
BY W. C. Parnell
ATTORNEY

Patented Jan. 27, 1953

2,626,973

UNITED STATES PATENT OFFICE 2,626,973

GROUNDING TERMINAL

Frank A. Dutra, Wyckoff, N. J., assignor to Western Electric Company, Incorporated, New York, N. Y., a corporation of New York Application June 28, 1949, Serial No. 101,835

2 Claims. (Cl. 173—324)

This invention relates to terminals and a method for making them, and more particularly to electrical terminals which are used for grounding portions of electrical circuits.

In apparatus units comprising a formed sheet metal chassis with electrical apparatus components mounted on one or both sides thereof, it is common practice to ground the chassis and to connect the various points or components in the circuit which are to be grounded to a nearby point on the chassis by a wire soldered to an eyelet or to a lug struck out of the chassis material. A single chassis may require a considerable number of grounding terminals which adds appreciably to the cost of manufacture. In addition, where struck out lugs are used, difficulty is often encountered in grounding wires extending from components on the side of the chassis opposite to the side having the struck out terminals. Also, such terminals sometimes become broken away from the chassis, which means that no grounding points are available at these particular locations on the chassis.

It is therefore an object of this invention to enable two terminals to be formed from a sheet of conductive material at a particular point thereon with one forming operation.

Applicant accomplishes his object by striking one terminal out of the sheet material and so shaping the configuration of this terminal as to leave in the plane of the material a second terminal having a contour generally similar to that of the struck terminal.

Other objects and features will be apparent from the following detailed description taken in conjunction with the attached drawing, in which.

Figure 1:
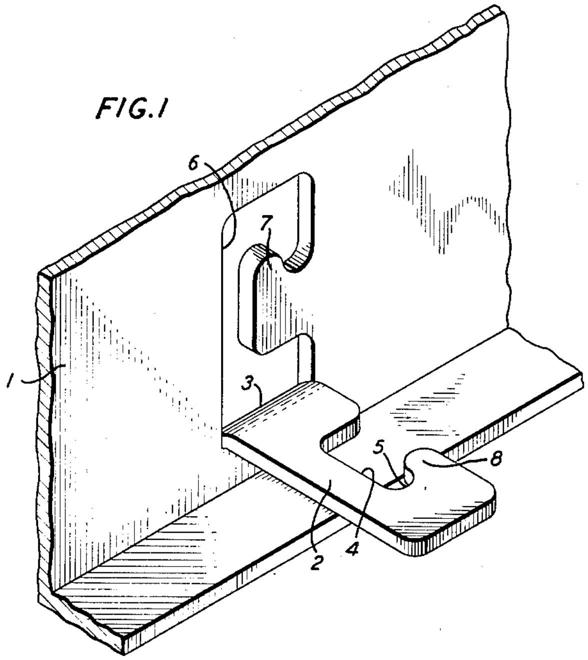
Fig. 1 shows the two terminals which are formed according to the invention.

With reference to the drawing, a suitable plate from which the proposed terminal is to be struck is designated as 1. The plate may be of any suitable conductive material such as steel or copper and should be thin enough to facilitate the punching operation and still strong enough to enable it to be used as part of a frame or chassis, which would be its usual function.

At each point on the plate 1 where a lead connection is required a terminal 2 in the shape of a lug is punched or struck out of the plate and is bent about one of its edges 3 to a position at some angle with the plate. The punching or striking out of the terminal 1 may be done in any conventional manner, and does not form a part of the present invention.

The terminal 2 is designed to have a configuration which will provide one or more narrow wire receiving sections such as 4 and 5 for receiving lead wires to be connected thereto. More important, its contour is chosen so that when the terminal 2 is struck out of the plane of the plate, there will be left remaining in the opening 6 thus created a projection 7 which has a configuration generally similar to that part of terminal 2 comprising the projection 8 and the section 5, and which constitutes an effective terminal. The forming of the first terminal 2 thus results in the formation of a second terminal 7, which is conveniently located for accommodating lead wires which cannot readily be handled by the terminal 2.

Figure 2:
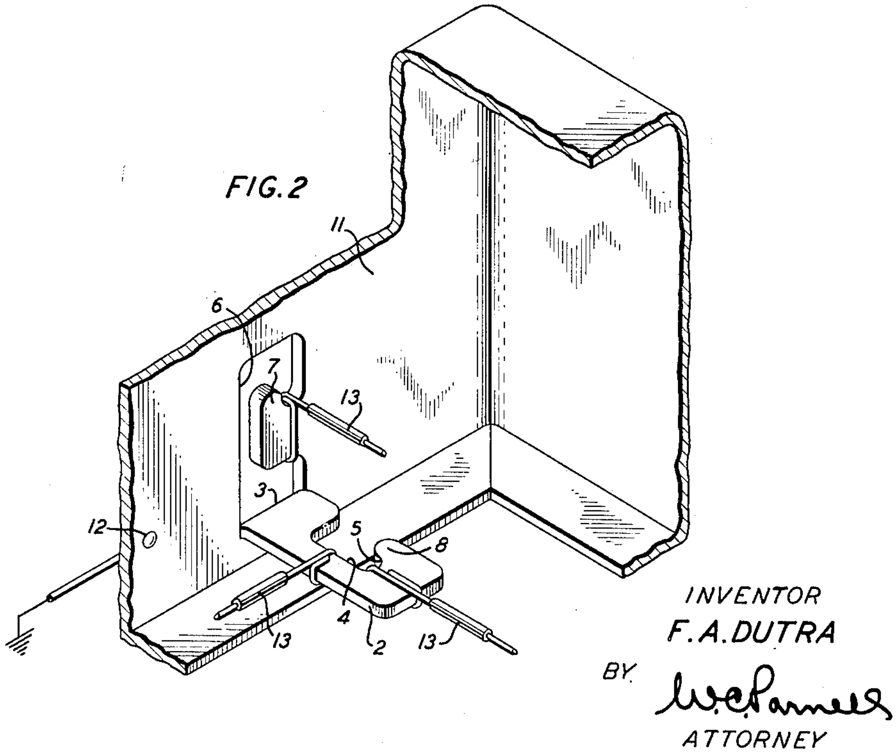
Fig. 2 shows the manner in which the two terminals thus formed may be used to ground leads from electrical components of a circuit.

One application to which the proposed method of forming terminals is especially adapted is shown in Fig. 2, in which the plate from which the terminals are struck is part of a sheet metal chassis used either for enclosing electrical components and equipment or for having such components and equipment mounted directly thereon. With reference to Fig. 2 such a chassis 11 is shown as grounded at 12. Any number of terminals 2 and 7 may be formed from the chassis sheet material at desired locations by the method described in connection with Fig. 1. Lead wires 13 from electrical components which are to be grounded are connected to either of the two terminals as shown. The terminals 7 are particularly suited to accommodating leads coming from the side of the chassis opposite to that containing the struck out terminals 2.

The feature of the terminal forming method described above which is believed to represent invention is the shaping of the contour of the terminal which is struck out of the plate material so that a projection is left in the plane of the plate after the struck terminal has been bent away which corresponds generally to the shape of the first terminal, and which serves as a second terminal at the same location on the plate. Where frames or chassis associated with electrical circuits and components are provided with grounding terminals by the method described herein, the cost of providing such terminals is greatly reduced, since two terminals are produced by each forming operation. This saving in cost is especially significant where the number required is large.

A further advantage of forming terminals according to the invention is that where the struck terminal breaks off from the chassis material for any reason, the presence of the terminal formed in the plane of the sheet material insures having some means of connection available at that point on the chassis.

Although the invention has been described with particular reference to use in grounding components of electrical circuits associated with a metal chassis, it is obviously not limited to such an application but is of general application in any instance where it may be desirable to form two electrical terminals at the same location with the same forming action.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A two terminal assembly comprising a first hook-shaped terminal pressed out of a sheet of metal about one edge of the terminal and having such configuration that when pressed out it leaves in the plane of the opening thus created, a second hook-shaped terminal around which the end of a wire may be wrapped from either side of the sheet.

2. A grounding terminal means for a sheet metal chassis comprising a first terminal pressed out of the chassis to form an angle therewith and having such a configuration that the contour of the opening made thereby in the chassis includes a hook-shaped projection around which the end of a wire may be wrapped from either side of the chassis.

FRANK A. DUTRA.

REFERENCES CITED

The following references are of record in the file of this patent:

UNITED STATES PATENTS

| Number | Name | Date |
|---|---|---|
| 1,932,923 | Bullinger | Oct. 31, 1933 |
| 2,196,147 | Dunn | Apr. 2, 1940 |
| 2,432,966 | Del Camp | Dec. 16, 1947 |